Patented July 24, 1951

2,561,658

UNITED STATES PATENT OFFICE 2,561,658

MERCAPTO FOLIC ACID AND PROCESS OF PREPARING SAME

Thomas Samuel Gardner, Rutherford, and Edward Wenis, Leonia, N. J., assignors to Hoffmann-La Roche Inc., Nutley, N. J., a corporation of New Jersey No Drawing. Application April 15, 1948, Serial No. 21,304

7 Claims. (Cl. 260—251.5)

The present invention relates to a new synthesis of folic acid, and to new intermediates useful in the preparation of this compound.

Folic acid, also known as pteroylglutamic acid, has been obtained synthetically by reacting together 2,4,5-triamino-6-hydroxy-pyrimidine, p-aminobenzoyl-1-(+)-glutamic acid and 2,3-dibromopropionaldehyde, or a halopyruvic aldehyde, such as chloropyruvic aldehyde.

The present invention provides a new method for producing folic acid. The method employed can be illustrated by the following equation:

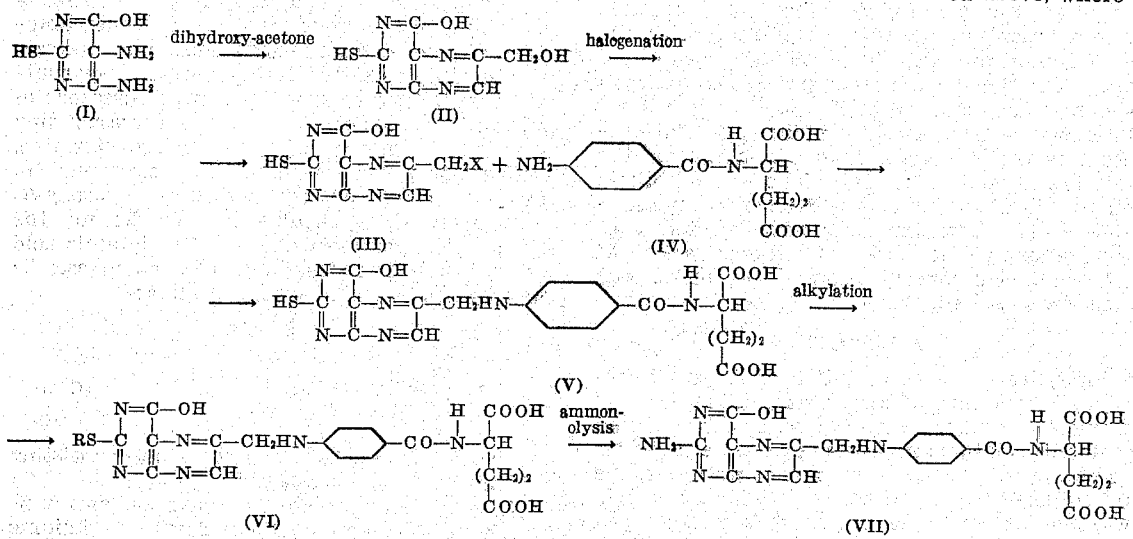

In the above equation R stands for a lower alkyl group, such as methyl, ethyl, propyl, isopropyl, and the like, and X stands for a halogen such as chlorine.

Thus, 2-mercapto-4,5-diamino-6-hydroxy-pyrimidine formate (I), which per se is a known compound and can be prepared by methods described in the literature, is condensed with dihydroxy-acetone in the presence of an oxidizing agent, such as hydrazine to form 2-mercapto-4-hydroxy-6-hydroxymethyl-pteridine (II) which is halogenated, as for example by thionyl chloride, to produce 2-mercapto-4-hydroxy-6-halogenomethyl-pteridine (III). The latter is then condensed with p-aminobenzoyl-1-(+)-glutamic acid (IV) to form N-[4-{-[(2-mercapto-4-hydroxy-6-pteridyl)-methyl]-amino}-benzoyl]-glutamic acid or 2-mercapto-2 desamino-folic acid (V) which is alkylated by reacting (V) with a lower alkyl halide, such as methyl iodide, to produce N - [4 - { - [(2 - lower alkylmercapto-4-hydroxy-6-pteridyl) - methyl - amino} - benzoyl] - glutamic acid or 2-lower alkylmercapto-2-desamino-folic acid (VI). Compound (VI) is then converted by ammonolysis to folic acid (VII).

Instead of starting with 2-mercapto-4,5-diamino-6-hydroxy-pyrimidine (I) there can be employed as a starting material a 2-lower alkylmercapto-4,5-diamino-6-hydroxy-pyrimidine, as for example 2-methylmercapto-4,5-diamino-6-hydroxy-pyrimidine. This is subjected to the same series of reactions described above, whereby the 2-lower alkylmercapto-compounds corresponding to (II), (III) and (V) are obtained. By starting with a 2-lower alkylmercapto-4,5-diamino-6-hydroxy-pyrimidine, compound (VI) is directly obtained, and the step of alkylating compound (V) eliminated.

Compounds (II), (III), (V) and (VI), and their corresponding 2-lower alkylmercapto derivatives are new compounds and form part of our invention.

The following examples will serve to illustrate our invention.

Example I

Sixty-four grams of 2-mercapto-4,5-diamino-6-hydroxy-pyrimidine formate were suspended in 250 cc. of water, and 27 g. of sodium acetate and 15 g. of acetic acid added. The suspension was heated up to 100° C. A solution (a) of 22.80 g. of 85% hydrazine was mixed with 250 cc. of water and a solution (b) of 30.3 g. of dihydroxyacetone in 267 cc. of water was made. Small equal volumes of solutions (a) and (b) were added at intervals of a period of four hours to the reaction mixture. When the reagent solutions were completely added, the heating was continued for two hours. During the reaction 2-mercapto-4-hydroxy-6-hydroxymethyl-pteridine separated out and when the reaction was completed the mixture was cooled, solids filtered off and washed with water, alcohol, and ether.

Twenty grams of the 2-mercapto-4-hydroxy-6-hydroxymethyl-pteridine so obtained were suspended in 200 cc. of thionyl chloride and heated under reflux for one hour with stirring. When the reaction was completed as indicated by cessation of the evolution of hydrochloric acid the excess thionyl chloride was removed in vacuum. The 2-mercapto-4-hydroxy-6-chloromethyl-pteridine thus obtained was then suspended in toluene and the toluene removed in vacuum in order to eliminate final traces of thionyl chloride.

Eight grams of 2-mercapto-4-hydroxy-6-chloromethyl-pteridine and 25.2 g. of p-aminobenzoyl-1-(+)-glutamic acid were dissolved in 250 cc. of ethylene glycol and heated to 50° C. for four hours. Eighty-five cc. of this reaction mixture was mixed with 20 g. of methyl iodide and 15 cc. of ethanol and allowed to stand overnight at 25° C. This yields a solution containing 2-methylmercapto-2-desamino-follic acid.

Fifty-five cc. of the reaction mixture was saturated with ammonia gas at 25° C. and then heated on a water bath for three hours under reflux. The reaction mixture was poured into water, the pH adjusted to 4 and the precipitate was filtered off. Ten grams of the crude product obtained in this way was dissolved in 100 cc. of ammonia solution, the pH adjusted to 4, 10 g. of diatomaceous earth were added as an absorbent and the mixture filtered. The crude folic acid adsorbate on the filter was washed with alcohol and then eluted with a solvent (50% ethyl alcohol, 30% conc. ammonia, 20% H₂O) for the extraction of folic acid. On concentration of the eluate, folic acid was obtained.

*Example 2*

Fifty-five cc. of the solution of 2-methylmercapto-2-desamino-folic acid as obtained in Example 1 was mixed with 100 cc. of concentrated ammonia solution and heated on a water bath for three hours. It was then poured into water, the pH adjusted to 4 and filtered. The precipitate was dissolved in 10 cc. of ammonia solution, adjusted to pH 4, and 10 g. of diatomaceous earth were added as an absorbent. The mixture was stirred for a few minutes and filtered. The adsorbate was washed with alcohol and then eluted as described in Example 1 to yield folic acid.

By following the procedure of Examples 1 and 2, but employing 2-methylmercapto-4,5-diamino-6-hydroxy-pyrimidine as a starting material there are obtained 2-methylmercapto-4-hydroxy-6-hydroxymethyl-pteridine, 2-methylmercapto-4-hydroxy-6-chloromethyl-pteridine, and 2-methylmercapto-2-desamino-folic acid, in that order, no alkylation step, of course, being required. The 2-methylmercapto-2-desamino-folic acid, is converted by ammonolysis into folic acid in the same manner as described in the examples. The following examples is illustrative of this procedure.

*Example 3*

Fifty-seven grams of 2-methylmercapto-4,5-diamino-6-hydroxy-pyrimidine were reacted with 46.5 grams of dihydroxyacetone at 100° C. for two hours in the presence of 91 grams of sodium acetate, 21 grams of acetic acid and 19.5 grams of hydrazine hydrate. On cooling, 12.5 grams of crude 2-methylmercapto-4-hydroxy-6-hydroxymethyl-pteridine were obtained. The 12.5 grams of pteridine compound were heated under reflux with 100 ml. of thionyl chloride for 4 hours and the excess thionyl chloride was then removed by vacuum distillation and displacement by toluene.

The 2-methylmercapto-4-hydroxy-6-chloromethyl-pteridine thus prepared was heated at 50° C. for four hours in ethylene glycol solution with 42.6 grams of p-aminobenzoyl-1-(+)-glutamic acid. The reaction mixture was poured into 1 liter of cold water and the pH adjusted to 4 with dilute hydrochloric acid. After standing for 16 hours the material was filtered off and dried after washing with water. Yield 8.05 grams of crude 2-methylmercapto-2-desamino-folic acid.

250 milligrams of the 2-methylmercapto-2-desamino-folic acid thus prepared were refluxed with concentrated ammonia solution (100 ml.) for 4 hours. The solution was diluted to 1 liter, 25 grams of diatomaceous earth added, stirred and filtered after two hours. The filter cake was washed with 100 ml. of alcohol three times and eluted three times with 100 ml. of the eluting solvent described in Example 1. The eluted material was concentrated under vacuum to dryness to yield folic acid.

We claim:

1. The process which comprises condensing a compound of the group consisting of 2-mercapto-4,5-diamino-6-hydroxy-pyrimidine and 2-lower alkylmercapto-4,5-diamino-6-hydroxy-pyrimidines with dihydroxy-acetone in the presence of an oxidizing agent to form the corresponding mercapto-4-hydroxy-6-hydroxymethyl-pteridine, halogenating the last mentioned compound to form the corresponding mercapto-4-hydroxy-6-halogeno-methyl-pteridine, and condensing the latter with p-aminobenzoyl-1-(+)-glutamic acid to form the corresponding acid, which can be represented by the following formula:

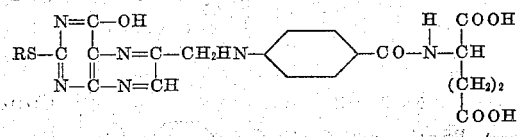

wherein R is selected from the group consisting of hydrogen and lower alkyl.

2. The process which comprises condensing 2-mercapto-4,5-diamino-6-hydroxy-pyrimidine formate with dihydroxy-acetone in the presence of hydrazine, chlorinating the condensation product formed with thionyl chloride to form 2-mercapto-4-hydroxy-6-chloromethyl-pteridine, and condensing the latter compound with p-amino-benzoyl-1-(+)-glutamic acid to form N-[4-{[(2-mercapto-4-hydroxy-6-pteridyl)-methyl]-amino}-benzoyl]-glutamic acid.

3. A process which comprises condensing 2-methylmercapto-4,5-diamino-6-hydroxy-pyrimidine with dihydroxy-acetone in the presence of hydrazine, chlorinating the condensation product with thionyl chloride to form 2-methylmercapto-4-hydroxy-6-chloromethyl-pteridine and condensing the latter compound with p-aminobenzoyl-1-(+)-glutamic acid to form N-[4-{[(2-methylmercapto-4-hydroxy-6-pteridyl)-methyl]-amino}-benzoyl]-glutamic acid.

4. N-[4-{-[(2-mercapto-4-hydroxy-6-pteridyl)-methyl]-amino}-benzoyl]-glutamic acid.

5. N-[4-{-[(2-lower alkylmercapto-4-hydroxy- 6-pteridyl)-methyl]-amino}-benzoyl]-glutamic acid.

6. N-[4-{-[(2-methylmercapto-4-hydroxy-6-pteridyl)-methyl]-amino}-benzoyl]-glutamic acid.

7. A compound selected from the group consisting of N-[4-{[(2-mercapto-4-hydroxy-6-pteridyl)-methyl]-amino}-benzoyl]-glutamic acid and N-[4-{[(2-lower alkylmercapto-4-hydroxy-6-pteridyl)-methyl]-amino}-benzoyl]-glutamic acid.

THOMAS SAMUEL GARDNER.
EDWARD WENIS.

No references cited.